United States Patent [19]

Ragettli et al.

[11] Patent Number: 4,557,135
[45] Date of Patent: Dec. 10, 1985

[54] DEVICE FOR MANIPULATING WORKPIECES

[75] Inventors: Christian Ragettli, Gockenhausen; Theo Frei, Zofingen, both of Switzerland

[73] Assignee: Haemmerle AG, Zofingen, Switzerland

[21] Appl. No.: 565,769

[22] Filed: Dec. 27, 1983

[30] Foreign Application Priority Data

Jan. 6, 1983 [CH] Switzerland .............................. 63/83

[51] Int. Cl.⁴ ........................ B21D 43/10; B21D 43/11
[52] U.S. Cl. ........................................ 72/420; 72/422; 72/389
[58] Field of Search ................. 72/380, 386, 389, 419, 72/420, 422; 83/267, 704, 708

[56] References Cited

U.S. PATENT DOCUMENTS

| | | | |
|---|---|---|---|
| 3,834,213 | 9/1974 | Henzler | 72/420 |
| 4,114,418 | 9/1978 | Jarman | 72/419 |
| 4,242,898 | 1/1981 | Salvagnini | 72/306 |

FOREIGN PATENT DOCUMENTS

| | | | |
|---|---|---|---|
| 2057515 | 6/1971 | Fed. Rep. of Germany | 72/422 |
| 37035 | 11/1975 | Japan | 72/420 |
| 48425 | 4/1980 | Japan | 72/386 |
| 100839 | 8/1980 | Japan | 72/422 |
| 144330 | 11/1980 | Japan | 72/420 |

*Primary Examiner*—Lowell A. Larson
*Attorney, Agent, or Firm*—Werner W. Kleeman

[57] ABSTRACT

This device is especially suited for gripping heavy and cumbersome pieces of sheet metal without human force and transporting them from a stacking device to a bending press for further processing. By means of rotatable clamping of gripping jaws mounted on a vertically movable jaw carriage, a laterally movable first horizontal carriage, a longitudinally movable second horizontal carriage and a swivel or turning device, any piece of sheet metal can be directly rotated or turned about a horizontal gripping jaw axis or can be rotated in the plane of the sheet and then regripped, or can be subjected to both actions. The piece of sheet metal normally held by two pairs of jaws is further supported below the jaw axis by multi-component sheet metal support devices carried on two independently movable sheet metal support carriages. This makes it possible to position each edge of the metal sheet or panel in the operating region of a suitable tool, such as a bending die for upward and downward bending operations and to hold the sheet metal sheet in position during the working operation.

22 Claims, 6 Drawing Figures

DEVICE FOR MANIPULATING WORKPIECES

BACKGROUND OF THE INVENTION

The present invention broadly relates to a new and improved device or apparatus for manipulating workpieces in a machine, such as a press and, more specifically, pertains to a new and improved construction of a device or apparatus for manipulating workpieces, especially sheets or panels in and around the operating region of a die of a bending press.

A device for manipulating workpieces in a press area of a forging press is known from the German Patent Publication No. 2,806,987, granted Aug. 21, 1980. The upper of two superimposed transport carriages for motion in a forward and backward direction or for to-and-fro movement carries a lifting carriage on a vertical spindle. The lifting carriage comprises a jaw carriage having at least one manipulating jaw and at least one adjusting gear rack driven by a pinion mounted on the vertical spindle. The manipulating jaws are actuated by an actuating cylinder and piston mechanism. This device is suited for individual processing of workpieces, such as forging, drop forging or punching. The disadvantage of this device is that the manipulating jaws release the workpiece for operations in the press and remain outside of the operating region of the press during the work stroke. The jaws must reengage the workpiece for each subsequent manipulation required for further processing.

German Patent Publication No. 2,847,543, published Aug. 21, 1980, discloses a loading and unloading device for presses or similar machine tools whose function is to lift a workpiece from a pile or stacking area, to deposit it in the operating region of a press or a punch and to lift it out of the die again after completion of the operation and to deposit it on a pile or stacking area. To achieve a predetermined sequence of motion comprising essentially straight line horizontal back-and-forth motions with vertical motions in both end phases, a portion of a four-bar or parallelogram linkage is employed as a transport arm driven by a corresponding cam plate and crosshead or crank rocker mechanism. This device is also suited for delivering material to presses or punches in which the workpiece is processed while the loading device remains outside of the operating region of the press. The disadvantage of this known device is that it, too, releases and regrips the workpiece for each operation or for unloading it.

SUMMARY OF THE INVENTION

Therefore, with the foregoing in mind, it is a primary object of the present invention to provide a new and improved construction of a device or apparatus for manipulating workpieces, such as sheets or panels, which does not have associated with it the aforementioned drawbacks and shortcomings of the prior art constructions.

Another and more specific object of the present invention aims at providing a new and improved construction of a manipulating device or apparatus of the previously mentioned type for machines, in particular presses, especially for bending presses, which permits the automatic and timesaving positioning of workpieces, especially heavy and awkward or cumbersome workpieces, for instance large and heavy sheets or panels that a single worker cannot, or can only with great difficulty, move without auxiliary means.

In keeping with the immediately preceding object it is a further object of the invention to provide a manipulating device which positions the sheets or panels in a press for performing various flanging or bending operations, and wherein flanges or bent edges can be formed having the same orientation on the same edge of the sheet or opposed orientations can be formed on the opposite edges of the sheet without releasing the sheet from the manipulating or gripping jaws between the individual processing steps.

Yet a further significant object of the present invention aims at providing a new and improved construction of a manipulating device of the character described which is relatively simple in construction and design, extremely economical to manufacture, highly reliable in operation, not readily subject to breakdown and malfunction and requires a minimum of maintenance and servicing.

Now in order to implement these and still further objects of the invention, which will become more readily apparent as the description proceeds, the device of the invention for manipulating workpieces in a press, especially for manipulating sheets or panels in and around the operating region of the die of a bending press, is manifested by the features that it comprises a lateral transport carriage slidably movable in a substantially horizontal direction extending substantially parallel to the operating plane or plane of movement of the die of the press, a longitudinal transport carriage cooperating with the lateral transport carriage and slidably movable in a substantially horizontal direction extending substantially perpendicular to the operating plane or plane of movement of the die of the press, a manipulating or gripping jaw carriage supported by the longitudinal transport carriage for movement in a substantially vertical direction extending substantially parallel to the operating plane or plane of movement of the die of the press, manipulating or gripping jaw means rotatably mounted on the gripping jaw carriage for holding, supporting and manipulating the sheet or panel-like workpieces, and a swivel or turning means disposed to act in a plane substantially coincident with the plane of a sheet or panel-like workpiece serves to turn or rotate the workpiece.

The advantages obtained by the invention are essentially that, for instance, heavy and awkward or cumbersome sheets or panels of metal plating to be delivered to a press, to be manipulated and positioned for performing desired operations, such as bending, pressing, punching, stamping, forging or shearing operations and to be removed as processed workpieces, can be automatically transported and handled without unnecessary loss of time and in accurately repeatable manner and that individual components can be modularly added to the basic version of the device on both the supply and delivery sides.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
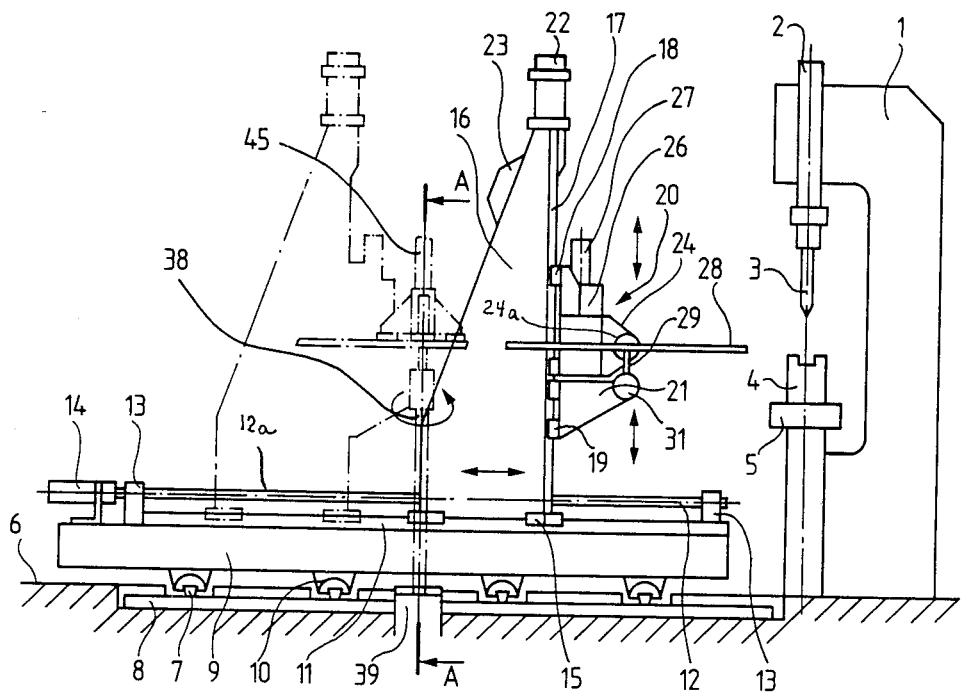
FIG. 1 shows a schematic side view of a manipulating device or apparatus installed in front of a press.
Figure 2:
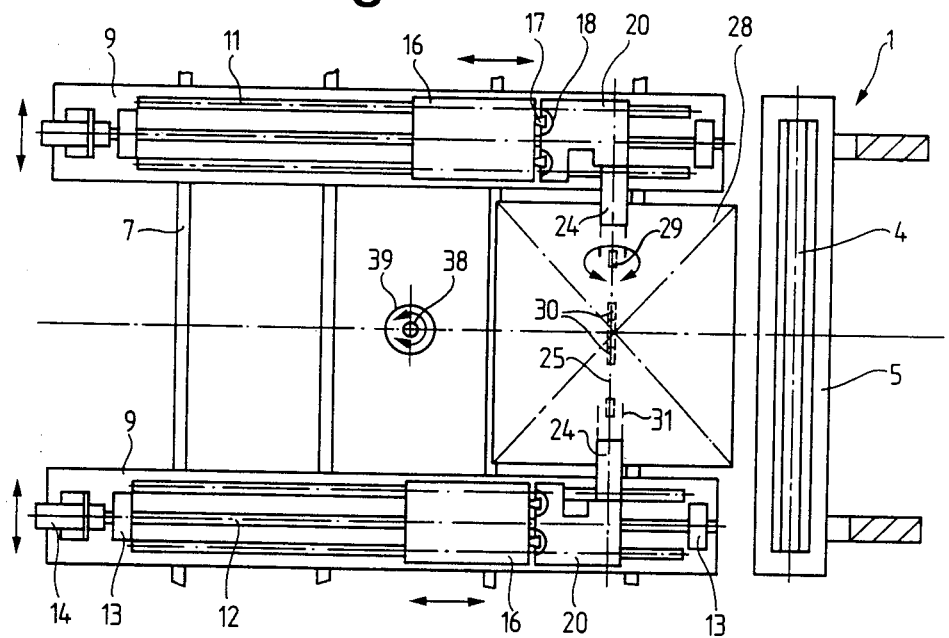
FIG. 2 shows a schematic plan view of the manipulating device according to FIG. 1.

Describing now the drawings, it is to be understood that only enough of the details of the construction of the exemplary embodiments of device or apparatus for the manipulation of workpieces has been shown therein as will enable those skilled in the art to readily understand the underlying principles and concepts of the present development, while simplifying the illustration of the drawings. Turning attention now specifically to FIGS. 1 and 2, there is depicted a suitable machine tool, such as a press, particularly a flanging press or bending press, 1 which has an operating ram 2, a jaw or die 3, a die block or anvil 4 and a work table or platen 5. In front of the bending press 1 guideways or rails 7 are embedded into the floor 6 parallel to the die 3 of the press 1 to accommodate two lateral transport carriages 9 oriented substantially perpendicular to the die 3 and slidable on the guideways or rails 7 in a direction extending substantially parallel to the die 3. These guideways or rails 7 have, for instance, a trapezoidal or dovetail cross-section and are mounted on a foundation 8. Sliding linear ball bearing guide elements 10 engage the guideways or rails 7 and form a connection between such guideways or rails 7 and the lateral transport carriage 9. The guideways 7 are embedded into the floor 6 in such manner that the area in front of the press 1 and between the longitudinal transport carriages 9 can be walked on or driven over without difficulty.

Two dovetail guideways 11 and a recirculating ball-drive spindle arrangement 12a are mounted on each lateral transport carriage 9 in the longitudinal direction. The drive spindle 12 of such ball-driven spindle arrangement 12a is supported in a bearing 13 at each end and is driven by a geared motor 14. The guideways or rails 11 engage linear ball bearing elements 15 of a longitudinal transport carriage 16 which can be moved in a direction substantially perpendicular to the die 3, i.e. to its operating plane or plane of movement. Two still further trapezoidal or dovetail guideways or rails 17 are mounted substantially vertically on the face of each longitudinal transport carriage 16 that is oriented toward the die 3. A respective gripping jaw carriage 20 engages the related vertical guideways 17 by means of linear ball bearing elements 18, 19 and can move vertically. A respective vertically movable workpiece support carriage 21 also engages the related vertical guideways 17. The gripping jaw carriages 20 and the workpiece support carriages 21 can each be moved independently in a vertical direction by means of any suitable drive, such as conventional chain drive means not shown in the drawings. An associated geared motor 22 for driving the related gripping jaw carriage 20 and a hydraulic drive unit 23 for driving the workpiece support carriage 21 are provided at the upper end of the vertical guideways of the related longitudinal transport carriage 16.

Each gripping jaw carriage 20 has a fluid-operated, for instance hydraulically closable, manipulating or gripping jaw or clamp 24. Each such gripping jaw 24 comprises two pivoting jaw members 24a and is hydraulically self-regulating in relation to the thickness of the workpiece, here the sheet or panel 28 to be gripped. Each gripping jaw 24 is rotatable about its horizontal mounting axis 25. An associated rotary drive 26 is driven by a vertically arranged motor 27. The sheet or panel 28 to be processed is normally supported by the two opposing gripping jaws 24. Workpiece support elements 29 and 30 are provided between and immediately adjacent to the gripping jaws 24 and also at a position approximately halfway between the gripping jaws 24, respectively. The workpiece support elements 29, 30 are supported by two tubular workpiece support members or hollow shafts 31 mounted in the workpiece support carriages 21 and reinforced by truss rods 32 or equivalent structure. The central workpiece support element 30 comprises a hollow body or chassis 33 which interconnects the ends of the tubular workpiece support members or hollow shafts 31 and to which the truss rods 32 are anchored. A coupling member 34 is rotatably mounted in the hollow body 33 and is connected by a swivel pin 37 to a workpiece support blade 35. The support blade 35 engages with an arresting device 47, containing for instance slots in the hollow body 33. The vertically movable ram 38 of a swivel or turning device 39 enters into the coupling member 34. This swivel or turning device 39 is embedded in the floor 6 in the center of the manipulating device.

Figure 3:
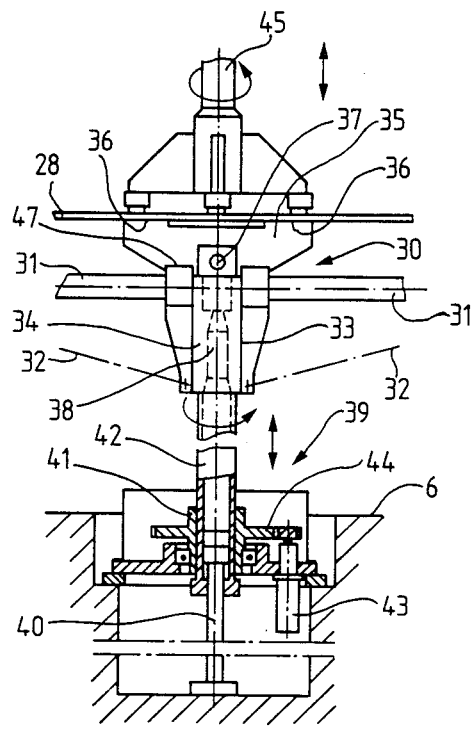
FIG. 3 shows a detail view taken essentially at section line A—A in FIG. 1.

The device for swivelling or turning the sheet or panel 28 in its own plane is shown as a detail in FIG. 3. A piston 40 mounted substantially vertically in the base of the swivel device 39 is guided by a cylinder 42. The cylinder 42 is mounted in a guide collar or element 41 to be vertically movable but locked against rotation therein. A geared motor 43 and a reduction drive or gearing 44 serve to rotate the guide collar 41 and with it the cylinder 42 about a vertical axis. The vertical motion of the cylinder 42 and the ram 38 is effected by a conventional hydraulic system not shown in the drawing. A rotatable and vertically movable counter support or stabilizer pad 45, which may for instance be fitted with vacuum or suction cups as holding devices, serves as a further holding or hold-down means for the sheet or panel 28 and as a counter force element for the manipulating device for rotating or swivelling the sheet or panel 28 in its own plane. The counter support or stabilizer pad 45 is slidably mounted on a not particularly here shown yoke extending over the manipulating device. The stabilizer pad 45 can also be used as an infeed means to deliver the sheets or panels 28 to be processed.

Figure 4:
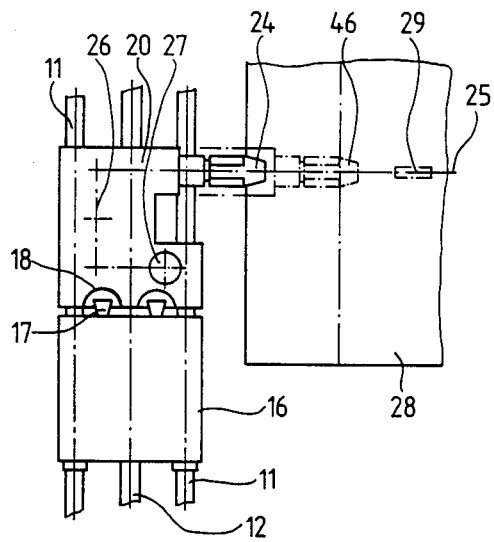
FIG. 4 shows a detail view of a gripping jaw carriage according to the plan view of FIG. 2.

In FIG. 4, the gripping jaw carriage 20 is shown on a larger scale. The vertical guideways 17 are mounted on the related longitudinal transport carriage 16. The gripping jaw carriage 20 engages the vertical guideways 17 by means of the linear ball bearing elements 18 in a vertically movable manner. The gripping jaw carriage 20 comprises the vertically mounted motor 27, the rotary gear box or gearing 26 and the gripping jaw 24.

A further embodiment of the invention is shown in phantom or broken lines in FIG. 4 and has an extended manipulating or gripping jaw or clamp 46 for gripping the sheet or panel 28 in a region behind the die 3. The sheet or panel 28 is supported by the workpiece supports 29 beneath the gripper axis 25 of the gripping jaws 24. The longitudinal transport carriage 16 is slidingly guided on the horizontal guideways 11 extending substantially perpendicular to the die 3 and is moved back and forth by the recirculating ball-drive spindle arrangement 12a.

Figure 5:
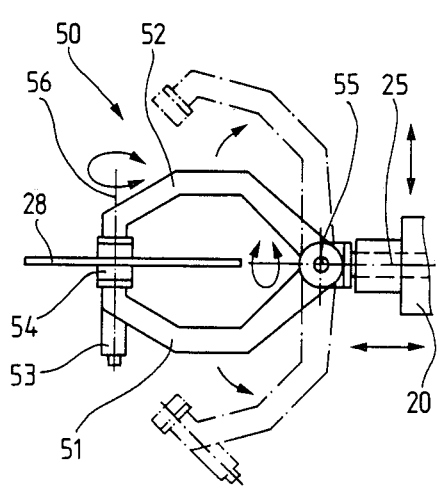
FIG. 5 shows a schematic side elevational view of an alternative embodiment of a gripping jaw.
Figure 6:
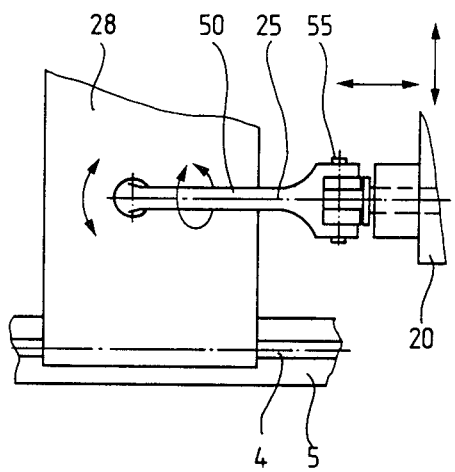
FIG. 6 is a plan view of the gripping jaw according to FIG. 5.

The gripping jaw 50 illustrated in FIGS. 5 and 6 comprises a lower jaw member 51 and an upper jaw member 52. Both jaw members 51, 52 are closably mounted on a pivot pin 55. A swivel or rotating device 54 having a geared motor 53 is mounted in the lower jaw 51. The manipulating or related gripping jaw or clamp 50 is rotatably mounted in the gripping jaw carriage 20 and is rotatable about the substantially horizontal axis 25. The sheet or panel 28 gripped by the gripping jaw 50 can be rotated in its own plane about a vertical axis 56 by means of the swivel device 54. The reference numbers 4 and 5 in FIG. 6 respectively designate the die block and work table or platen of a press.

The manipulating device described above operates in the following manner:

By means of a suitable transfer device having gripping means and not illustrated in the drawings, the counter support or stabilizer pad 45 deposits the individual sheets or panels 28 onto the workpiece supports 29, 30 positioned in the center of the manipulating device and lying below the axis of rotation or gripper axis 25 of the gripping jaws 24 and holds it in a substantially horizontal position. Both lateral transport carriages 9 mutually approach one another and the opened gripping jaws 24 pass over the side edges of the sheet or panel 28. Motion stops as soon as the side edges of the sheet or panel contact the throat of the gripping jaws. A hydraulically actuated wedge or equivalent actuating unit closes the jaw members of the gripping jaws 24 or 46 which automatically orient themselves substantially parallel to the surface of the sheet corresponding to the thickness of the sheet. The sheet or panel 28, supported by the workpiece support elements or supports 29, 30, is now moved toward the die 3 by the transport motion of the longitudinal transport carriage 16 at a height which permits the sheet 28 or the like to rest upon the work table or platen 5. By pushing the edge of the sheet against the die block 4 and simultaneously reducing the gripping or clamping force exerted by the clamping jaws 24 or 46, the edge of the sheet can be precisely positioned and made parallel to the die. The clamping jaws tighten again and the sheet 28 is ready for processing. It is raised above the die block and entered under the die 3 by the predetermined dimension required by the bending or pressing operation to be performed. In the bending or pressing operation, the two surfaces of the sheet on either side of the line of contact of the die 3 with the sheet 28 move upward. The closed gripping jaws, connected to the sheet by their gripping or clamping action, automatically participate in the corresponding motion, i.e. the longitudinal transport carriage 16 and the gripping jaw carriage 20 move simultaneously according to an exact program backwards and upwards while the gripping jaws 24 or 46 rotate in correspondence with the position of the sheet 28.

If a further bending or pressing operation of the same orientation is to be performed on the same edge of the sheet, the die 3 is returned to its initial open position and the area of the sheet in front of the die is returned to the horizontal position and once again entered under the die by the required dimension. The further bending or pressing operation is performed exactly the same as the preceding one.

If a bending or pressing operation of the reverse orientation is to be performed on the opposite sheet or panel edge, then the sheet or panel 28 gripped in the gripping jaws 24 or 46 is rotated about the axis of rotation or gripper axis 25 of the gripping jaws. The longitudinal transport carriage 16 withdraws from the die 3 far enough to permit the sheet or panel 28 to be rotated without encountering further machine components. When turning the sheet 28 or the like about the gripping jaw axis 25, the workpiece support elements 29 remain in position until the sheet reaches an angle at which no further support is required. The workpiece support elements or supports 29 are so structured that they can yield to the displacing forces exerted by the sheet or panel in this rotation and nevertheless supply the necessary supporting force. When the sheet has reached an angle of approximately 60° to the horizontal, the workpiece support carriages 21 move downward out of the way until the sheet has been turned. If the travel is not sufficient for the rotation of the sheet 28, the gripping jaw carriages 20 must be slid upward. As soon as the sheet 28 has passed through the vertical plane, the workpiece support carriages 21 move upward again in order to assume a suitable support position at the corresponding orientation of the sheet. When the sheet is horizontal again, the unprocessed edge is entered over the die block by a predetermined dimension and bent or pressed in the same manner as described above. If a bending or pressing operation of the reverse orientation is to be performed on the same edge of the sheet or if a bending operation of the same orientation is to be performed on the opposite edge of the sheet, the sheet must be rotated in its own plane before further processing. To perform this operation, the manipulating device together with the gripped sheet is transferred to a position where the central workpiece support element 30 is located over the ram 38 of the swivel or turning device 39. When this position has been reached, the cylinder 42 is hydraulically actuated to lift the ram 38 which engages the coupling member 34 of the workpiece support element 30 by means of dogs or equivalent structure preventing mutual rotation. Simultaneously, the counter support or stabilizer pad 45 descends and contacts the upper surface of the sheet 25. As soon as the coupling action has been completed and the stabilizer pad 45 rests upon the sheet 28, the gripping jaws 24 or 46 are opened and both longitudinal transport carriages 9 are moved so far away from the center that the distance between the gripping jaws is greater than the diagonal dimension of the sheet. The sheet, held in a substantially horizontal plane by the workpiece support element 30 and the stabilizer pad 45, is now slightly raised together with both gripping jaws 24 or 46 until the support blade 35 is lifted out of the arresting device or engaging slots 47 of the hollow body 33.

If the sheet 28 or the like has already been provided with disturbing flanges or bends, then the vertical motion must be correspondingly greater. The geared drive motor 43 of the swivel or turning device 39 now turns the cylinder 42 by means of the reduction gear box 44, turning with it the sheet or panel 28 gripped between the support blade 35 and the counter support or stabilizer pad 45 in its own plane, for instance through 90° or 180°. After the support blade 35 together with the sheet or panel has been returned to the arresting device or engaging slot 47 of the hollow body 33, the lateral transport carriages 9 move with open gripping jaws 24 or 46 toward the sheet. These gripping jaws grip the sheet 28 as soon as the edges of such sheet contact the throat of the related clamping jaw. The longitudinal transport carriages 16 now move together with the gripped sheet 28 toward the die 3 as soon as the descending ram 38 disengages from the coupling member 34, and the stabilizer pad 45 has been elevated, in order to proceed with the planned bending or pressing operations after accurately positioning the sheet or panel in the manner previously described.

In order to be able to grip a sheet or panel 28 behind the die 3 for performing certain bending or pressing operations, the manipulating device is beneficially provided with the extended or prolonged gripping jaws 46. Both of the lateral transport carriages 9 are stationed laterally beyond the press 1 and the sheet 28 or the like is held by these extended gripping jaws 46 and supported by the workpiece support elements 29, 30. In order to permit the sheet or panel 28 with the gripping jaws 46 and the indispensable workpiece support elements or supports 29, 30 to enter behind the die 3, it is prerequisite that there be sufficient distance between the die 3 and die block 4 in the open position and that the frame of the press have a sufficient depth of throat or cantilever-type structure. In bending, the gripping jaws 46 attached to the sheet 28 by their gripping action, move jointly with that part of the sheet that is bent up behind the die. The horizontal motion of the longitudinal transport carriages 16, the vertical motion of the gripping jaw carriages 20 and the rotary motion of the gripping jaws 46 is precisely coordinated with the motion of the sheet or panel 28.

The hydraulic drive unit 23, operated for instance by oil and provided for moving the workpiece support carriages 21 and for providing the supporting force, is designed to provide the workpiece supports with a supporting force which compensates the dead weight of the sheet or panel workpiece and partially compensates the weight of the related gripping jaw carriage 20. This results in easier controllability of the gripping jaw 24 or 46 and of the related gripping jaw carriage 20, which must accurately follow the motion of the sheet 28 during the bending or pressing operation.

The manipulating gripping jaw or clamp 50 shown in FIGS. 5 and 6 permits smaller sheets 28 or the like to be manipulated and formed on all sides through the use of only a single gripping jaw and without requiring a releasing and regripping operation. Each edge of the sheet 28 can be turned to face the press 1 by means of the swivel or turning device 54 built into the lower jaw member 51. The orientation of the bending or pressing operation can be reversed by rotating the gripping jaw 50 about the axis of rotation 25. The sheet or panel 28 is entered into the press for processing at the correct height by the motion of the longitudinal transport carriage 16 towards the die 3 and by the vertical motion of the gripping jaw carriage 20 and of the workpiece support carriage 21. The necessary motion of the gripping device during processing is effected by the programmed motions of the longitudinal transport or support carriage 16 in the horizontal direction, the gripping jaw carriage 20 in the vertical direction and the workpiece support carriage 21 in the vertical direction as well as by the rotary motion of the gripping jaw 50 about the horizontal axis 25.

Instead of the manipulating device described above having two laterally sliding transport carriages 9 with a longitudinally sliding transport carriage 16 mounted on each of them, a manipulating device having a longitudinally sliding carriage with two laterally sliding carriages mounted upon it could also be provided.

It is possible to manipulate and process smaller sheets or the like held in a single gripping jaw. The gripping jaw would have to pass over the edge the sheet and grip it from above and below at substantially the center of the sheet. The gripping jaw would have to be rotatable about its horizontal mounting axis, on the one hand, and would have to be provided with a swivelling device in one of the jaw members of the gripping jaw to permit the sheet to be rotated in its own plane, on the other hand. This arrangement would permit all possible bending and pressing operations to be carried out without releasing and regripping the sheet or panel.

Although the manipulating device of the invention has been described in particular relation to bending and pressing operations performed at the edge of a sheet or panel-like workpiece, it will be understood that it can equally well be used in conjunction with embossing, stamping, punching, shearing, forging and similar operations and on workpieces having other configurations, for instance cast or forged billets.

Likewise, although the manipulating device of the invention has been described in relation to the automated processing of sheet metal, it could equally well be used for the automatic changing of press dies or die blocks or both, for instance when doing embossings in connection with three point bending. For this purpose a tool holder containing dies or die blocks accurately positioned in tool carrier devices would be mounted next to the press. For die changing, the gripping jaws of the manipulating device would grip the appropriate empty tool carrier device and use it to pick up a die in the press and to store it in the tool holder. The gripping jaws would then grip a tool carrier device having the new tool, install it in the machine and return the empty tool carrier device to the tool holder.

With the device of the invention it is easily possible to perform combined operations on several components automatically and according to a program. For instance, a foundation panel and a cover panel can be bent or flanged individually and independently of one another and, after the insertion of, for example, an insulating material, jointly bent or flanged and closed.

Instead of providing an extension to gripping jaws 46 for gripping the sheet or panel 28 to be bent or formed behind the die 3, a manipulating device could be installed behind the die of the press identical to the manipulating device in front of the press.

While there are shown and described present preferred embodiments of the invention, it is to be distinctly understood that the invention is not limited thereto, but may be otherwise variously embodied and practiced within the scope of the following claims.

Accordingly, what we claim is:

1. A device for manipulating workpieces in a press, especially for manipulating sheets or panels in and around the operating region of a tool of a forming or shearing press, comprising:
   at least one lateral transport carriage movable in a substantially horizontal direction substantially parallel to an operating plane of the tool of the press;
   at least one longitudinal transport carriage mounted on said at least one lateral transport carriage and movable in a substantially horizontal direction substantially perpendicular to the operating plane of the tool of the press;

at least one gripping jaw carriage mounted on said at least one longitudinal transport carriage and movable in a substantially vertical direction substantially parallel to said operating plane of the tool of the press;

at least one gripping jaw means movably mounted on said at least one gripping jaw carriage for supporting and manipulating a workpiece; and at least one turning means mounted in said at least one gripping jaw means and disposed to act in a plane substantially coincident with the plane of the workpiece for rotating the workpiece substantially in its own plane.

2. A device for manipulating workpieces in a press, especially for manipulating substantially sheet-like workpieces in and around the operating region of a tool of a press, comprising:

at least one first transport carriage translatable in a first horizontal direction;

at least one second transport carriage translatably engaging said at least one first transport carriage for translating in a second horizontal direction substantially perpendicular to said first horizontal direction along said at least one first transport carriage and for translating in said first horizontal direction conjointly with said at least one first transport carriage;

a predetermined one of said first horizontal direction and said second horizontal direction extending substantially parallel to a plane of movement of a tool of the press;

at least one gripping jaw carriage translatably engaging said at least one second transport carriage for translating in a substantially vertical direction substantially parallel to the plane of movement of the tool and for translating in said second horizontal direction conjointly with said at least one second transport carriage and for translating in said first horizontal direction conjointly with said at least one first transport carriage and said at least one second transport carriage;

at least one gripping jaw means rotatably mounted on said at least one gripping jaw carriage for gripping, for at least partially supporting and for manipulating a substantially sheet-like workpiece;

said substantially sheet-like workpiece defining a substantially horizontal plane when gripped and at least partially supported by said gripping jaw means; and at least one swivel means mounted in said at least one gripping jaw means for rotating said substantially sheet-like workpiece within said substantially horizontal plane.

3. The manipulating device as defined in claim 2, wherein:
said predetermined one of said first and second horizontal directions comprises said first horizontal direction.

4. The manipulating device as defined in claim 2, wherein:
said predetermined one of said first and second horizontal directions comprises said second horizontal direction.

5. The manipulating device as defined in claim 2, further including:
at least one workpiece support carriage translatably engaging said at least one second transport carriage at a location beneath to said at least one gripping jaw carriage for translating in said substantially vertical direction substantially parallel to the plane of movement of the tool in tandem with said at least one gripping jaw carriage; and at least one workpiece support means supported on said at least one workpiece support carriage for translating with said at least one workpiece support carriage and additionally supporting said substantially sheet-like workpiece in said substantially horizontal plane.

6. The manipulating device as defined in claim 5, further including:
hydraulic drive means for exerting a substantially vertical force upon said at least one workpiece support carriage;
said at least one gripping jaw means having a predetermined first weight;
said at least one workpiece support means having a predetermined second weight;
said substantially sheet-like workpiece having a determinate third weight; and
said substantially vertical force being sufficient to compensate the sum of at least part of said first weight, at least part of said second weight and substantially all of said third weight.

7. The manipulating device as defined in claim 5, wherein:
said at least one workpiece support means comprises;
at least one support member mounted in said at least one workpiece support carriage;
at least one workpiece support element rotatably mounted on said at least one support member for providing support to a central region of the substantially sheet-like workpiece; and
at least one counter support means for holding the substantially sheet-like workpiece in a substantially horizontal position.

8. The manipulating device as defined in claim 7, wherein:
said at least one counter support means comprises at least one holding device.

9. The manipulating device as defined in claim 2, wherein:
said at least one gripping jaw means is rotatable about a substantially horizontal axis extending substantially parallel to the plane of movement of the tool of the press.

10. The manipulating device as defined in claim 2, wherein:
the press has a front side and a rear side;
the manipulating device being situated on said front side;
a predeterminate front location being situated on said front side; and
said at least one first transport carriage, said at least one second transport carriage, said at least one gripping jaw carriage and said at least one gripping jaw means being constructed such that said at least one gripping jaw means can laterally grip an edge of the substantially sheet-like workpiece at said predeterminate front location.

11. The manipulating device as defined in claim 2, wherein:
the press has a front side and a rear side;
the manipulating device being situated on said front side;
a predeterminate rear location being situated on said rear side; and said at least one first transport carriage, said at least one second transport carriage, said at least one gripping jaw carriage and said at least one gripping jaw means being constructed such that said at least one gripping jaw means can laterally grip an edge of the substantially sheet-like workpiece at said predeterminate rear location.

12. A device for manipulating workpieces in a press, especially for manipulating substantially sheet-like workpieces in and around the operating region of a tool of a press, comprising:

at least one first transport carriage translatable in a first horizontal direction;

at least one second transport carriage translatably engaging said at least one first transport carriage for translating in a second horizontal direction substantially perpendicular to said first horizontal direction along said at least one first transport carriage and for translating in said first horizontal direction conjointly with said at least one first transport carriage;

a predetermined one of said first horizontal direction and said second horizontal direction extending substantially parallel to a plane of movement of a tool of the press;

at least one gripping jaw carriage translatably engaging said at least one second transport carriage for translating in a substantially vertical direction substantially parallel to the plane of movement of the tool and for translating in said second horizontal direction conjointly with said at least one second transport carriage and for translating in said first horizontal direction conjointly with said at least one first and said at least one second transport carriages;

at least one gripping jaw means rotatably mounted on said at least one gripping jaw carriage for gripping, for at least partially supporting and for manipulating a substantially sheet-like workpiece;

said substantially sheet-like workpiece defining a substantially horizontal plane when gripped and at least partially supported by said gripping jaw means;

at least one workpiece support carriage translatably engaging said at least one second transport carriage at a location beneath said at least one gripping jaw carriage for translating in said substantially vertical direction substantially parallel to the plane of movement of the tool in tandem with said at least one gripping jaw carriage; and at least one workpiece support means supported on said at least one workpiece support carriage for translating with said at least one workpiece support carriage and additionally supporting said substantially sheet-like workpiece in said substantially horizontal plane.

13. The manipulating device as defined in claim 1, wherein:
said predetermined one of said first and second horizontal directions comprises said first horizontal direction.

14. The manipulating device as defined in claim 12, wherein:
said predetermined one of said first and second horizontal directions comprises said second horizontal direction.

15. The manipulating device as defined in claim 12, further including:

hydraulic drive means for exerting a substantially vertical force upon said at least one workpiece support carriage;

said at least one gripping jaw means having a predetermined first weight;

said at least one workpiece support means having a predetermined second weight;

said substantially sheet-like workpiece having a determinate third weight; and said substantially vertical force being sufficient to compensate the sum of at least part of said first weight, at least part of said second weight and substantially all of said third weight.

16. The manipulating device as defined in claim 12, wherein:
said at least one workpiece support means comprises;
at least one support member mounted in said at least one workpiece support carriage;
at least one workpiece support element rotatably mounted on said at least one support member for providing support to a central region of the substantially sheet-like workpiece; and
at least one counter support means for holding the substantially sheet-like workpiece in a substantially horizontal position.

17. The manipulating device as defined in claim 16, wherein:
said at least one counter support means comprises at least one holding device.

18. The manipulating device as defined in claim 12, further including:
at least one swivel means mounted in said at least one gripping jaw means for rotating said substantially sheet-like workpiece within said substantially horizontal plane.

19. The manipulating device as defined in claim 18, wherein:
said gripping jaw means comprises:
at least two jaw elements structured to mutually close and to grip a central region of the substantially sheet-like workpiece; and
said at least one swivel means being disposed in one of said jaw elements for rotating the substantially sheet-like workpiece substantially in its own plane.

20. The manipulating device as defined in claim 12, wherein:
said gripping jaw means is rotatable about a substantially horizontal axis extending substantially parallel to the plane of movement of the tool of the press.

21. The manipulating device as defined in claim 12, wherein:
the press has a front side and a rear side;
the manipulating device being situated on said front side;
a predeterminate front location being situated on said front side; and
said at least one first transport carriage, said at least one second transport carriage, said at least one gripping jaw carriage and said at least one gripping jaw means being constructed such that said at least one gripping jaw means can laterally grip an edge of the substantially sheet-like workpiece at said predeterminate front location.

22. The manipulating device as defined in claim 12, wherein:
the press has a front side and a rear side;

the manipulating device being situated on said front side;
a predeterminate rear location being situated on said rear side; and
said at least one first transport carriage, said at least one second transport carriage, said at least one gripping jaw carriage and said at least one gripping jaw means being constructed such that said at least one gripping jaw means can laterally grip an edge of the substantially sheet-like workpiece at said predeterminate rear location.

* * * * *